(12) United States Patent
Koppe

(10) Patent No.: US 6,337,096 B1
(45) Date of Patent: Jan. 8, 2002

(54) FISH FODDER FOR BREEDING PURPOSES, IN THE FORM OF A DIET, AND A FEEDING PROCEDURE

(75) Inventor: Wolfgang M. Koppe, Stavanger (NO)

(73) Assignee: Nutreco Aquaculture Research Centre A/S, Stavanger (NO)

( * ) Notice: Subject to any disclaimer, the term of this patent is extended or adjusted under 35 U.S.C. 154(b) by 0 days.

(21) Appl. No.: 09/623,830

(22) PCT Filed: Feb. 17, 1999

(86) PCT No.: PCT/NO99/00051

§ 371 Date: Nov. 9, 2000

§ 102(e) Date: Nov. 9, 2000

(87) PCT Pub. No.: WO99/45798

PCT Pub. Date: Sep. 16, 1999

(30) Foreign Application Priority Data

Mar. 10, 1998 (NO) ............................................. 19981035

(51) Int. Cl.⁷ .............................. A23K 1/16; A23K 1/18
(52) U.S. Cl. ............................ 426/2; 426/656; 426/648; 426/805
(58) Field of Search ............................ 426/2, 656, 648, 426/805

(56) References Cited

U.S. PATENT DOCUMENTS

| | | | |
|---|---|---|---|
| 3,906,112 A | * | 9/1975 | Anderson ........................ 426/1 |
| 4,141,994 A | * | 2/1979 | Aneja et al. .................. 424/331 |
| 5,453,565 A | * | 9/1995 | Mawson ....................... 800/200 |
| 5,525,350 A | * | 6/1996 | Hansen et al. ................. 424/438 |

FOREIGN PATENT DOCUMENTS

| | | | |
|---|---|---|---|
| CN | 1123617 | * | 6/1996 |
| JP | 51013696 | * | 2/1976 |
| JP | 359078650 | * | 5/1984 |
| JP | 5198932 | * | 2/1995 |
| NO | 161474 | | 5/1989 |
| RO | 90915 | * | 1/1987 |
| RU | 2127044 | * | 3/1999 |
| WO | WO 92/07154 | | 6/1992 |
| WO | WO 94/21141 | | 9/1994 |

OTHER PUBLICATIONS

Andersen et al., Can. J. Rish. Aquet. Sci., vol. 50(2) pp. 316–322, 1993.*
Hastings et al., Feed stutts, USA, vol. 45(18), pp. 33–34, 1973.*
Wilson et al., Ann. Review of Nutrition, vol. 6, pp. 225–244, 1986.*
Abstract of Japanese Patent application No. JP 54020889 A, from Derwent WPI.
Abstract of Japanese Patent application No. JP 51013696 A, from Derwent WPI.

* cited by examiner

Primary Examiner—Chhaya D. Sayala
(74) Attorney, Agent, or Firm—Vidas, Arrett & Steinkraus

(57) ABSTRACT

A diet and method for improving the pigmentation of fish fillets and particularly fillets of salmonoides is disclosed. The diet involves the feeding of fish with fodder formed of protein, and lysine in an additional amount, approximating 8 to 9% of the amount of protein provided. In addition, the fodder may contain a carotenoid. The fish fodder is fed to the fish for a relatively short duration, approximating 4 to 8 weeks where feeding terminates prior to a starvation period which precedes harvesting of the fish.

7 Claims, 6 Drawing Sheets

FISH FODDER FOR BREEDING PURPOSES, IN THE FORM OF A DIET, AND A FEEDING PROCEDURE

This invention relates to a fodder for fish being bred, especially a diet fodder for salmonoides, containing at least one agent for improving the visible pigmentation of the fillets. Likewise, the invention concerns a feeding procedure associated with this diet fodder.

Synthetic pigments are added to fodder for salmonoides in order to give the fillets a pink (salmon red) colour. The price for this additional fodder ingredient in the form of coloured matter constitutes approximately 20 percent of the total price of the diet fodder. The pigment content of the fodder should, thus, be reduced.

At the same time, the predictability for achieving a sufficiently visible fillet pigmentation is low in fish having been allotted a certain diet, and the fish breeders risk, therefore, to slaughter fish not having obtained the intentional pigmentation.

Therefore, it would be desirable to have at one's disposal means to improve visible pigmentation in salmonoides and to put the means to use shortly before the slaughtering, without having to increase the pigment level when planning the composition of the diet.

BACKGROUND

Known pigmentation technique comprises to feed salmonoides with composite fodder substances containing between 30 and 100 mg/kg carotenoids, astaxanthin and/or canthaxanthin.

To meet target pigmentation at harvest, fish are sampled in the course of its growing period, and fillet pigmentation is monitored.

In order to secure an adequate pigmentation at the point of time for slaughtering, it may be necessary to use very high pigment levels. This increases the fodder costs and, thus, the production costs. Moreover, the reaction time is far too long. Many studies have shown that the pigment content of the fodder seems to have resulted in only 50% of the visual pigmentation which is measured by means of optical and visual means. Thus, increasing concentration of pigments does not secure an increasingly visible colouring of the fillets. Known pigmenting technique associated with desired fillet colour of slaughtered fish thusly bred, especially salmonoides, is, therefore, not predictable to a desired extent.

GENERAL DESCRIPTION OF THE INVENTION

An advantage of this invention is to provide a diet for feeding fish especially salmonoides during a short period of time prior to slaughtering, in order to increase the visible pigmentation of the fish meat.

This advantage is realized by means of a fodder containing a concentration of at least 8.6% lysine based on the protein in a diet fodder, and through a relatively brief feeding period, with such diet fodder—4–8 weeks before slaughtering.

The lysine-containing diet fodder according to the invention, as utilized during the indicated short feeding period, achieves a statistically significant increase in the pigmentation of the fillets as perceived visually, without having to alter the pigment levels in the diet fodder.

DETAILED DESCRIPTION OF THE PREFERRED EMBODIMENT

Figure 1:
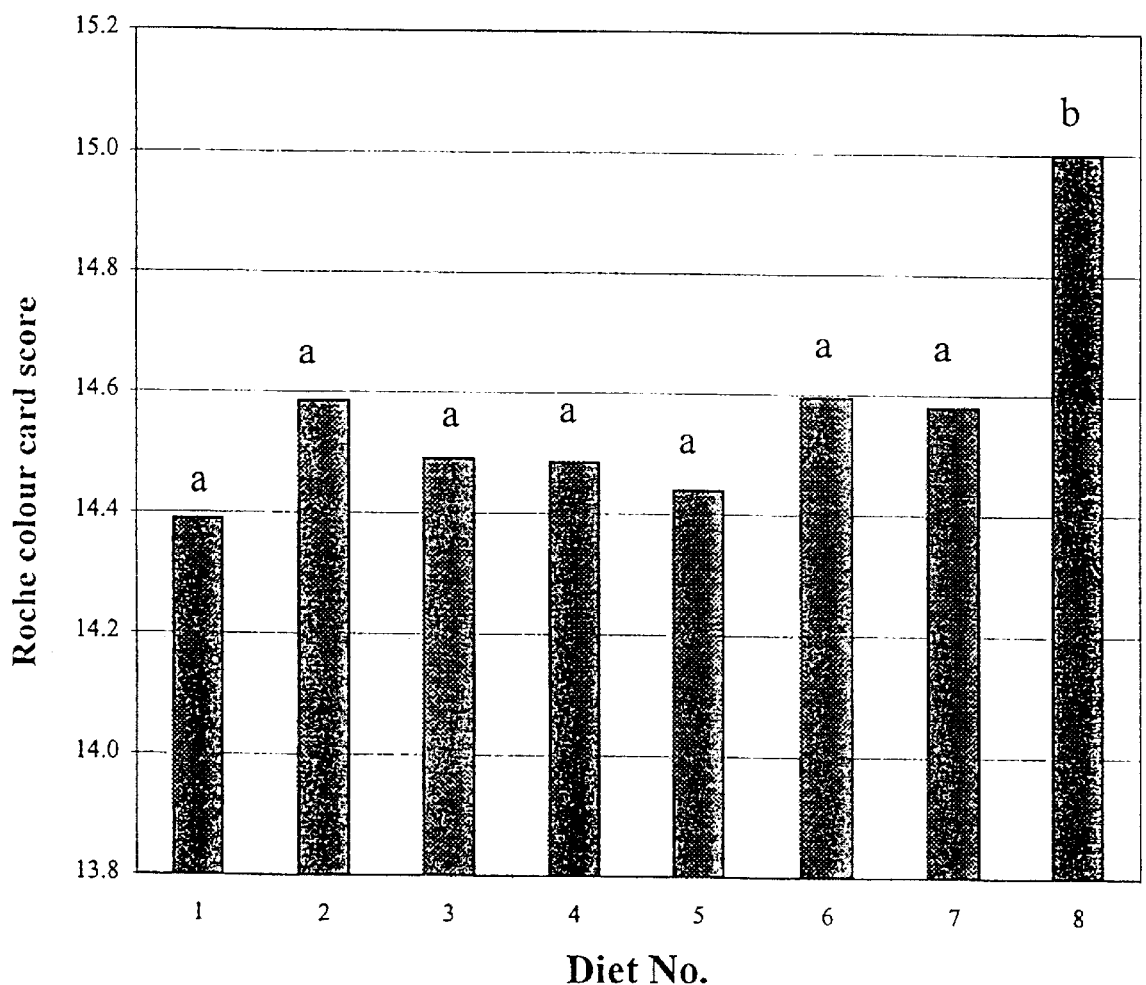
FIG. 1 is a graph representing Roche color card source and diet number.

The provision of a special diet for feeding of salmonoides during a short period prior to harvesting increases the visible pigmentation of the fish meat. The provision of a fodder containing a concentration of at least 8.6% lysine based on the protein in the diet fodder, as provided during a relatively brief feeding period of approximately 4 to 8 weeks prior to harvesting, increases the visible pigmentation of the fish meat. The lysine-containing diet fodder according to the invention, as utilized, during the indicated short feeding period achieves a statistically significant increase in the pigmentation of the fillets as perceived visually, without having to alter the pigment levels in the diet fodder.

Lysine ($\alpha,\epsilon$-diaminocapronic acid) is an essential amino acid in fodder for fish. Lysine is either derived from the natural raw materials used in fish fodder compositions, or it is added in the synthetic form thereof. Requirement for lysine addition in salmon fodder to cause optimal growth of salmon is 19.9 g lysine/kg diet or 3.8% of the protein in the diet. (Anderson et al 1992).

Visual pigmentation of fish fodder when using carotenoides generally depends on two factors:

a) concentration of pigments in the fish meat, and b) the physical, structural and chemical properties of the muscles. Only about 50% of the visible colour can be explained through pigment concentration. The rest descends from the way the muscle fibres reflect light.

As shown in FIGS. 1–6 the agents included within the diet fodder according to the present invention seems to affect the way in which the fish meat reflects light. Even when the pigment level is increased compared to control groups, the visible colour outcome is far higher than expected based on the difference in pigment concentration. Measurement of colour components by means of a chromameter (Minolta values) seems to indicate a consistent reduction in Minolta L-value in fish bred with fodder substances having a high lysine content. The L-value decides the quality of the lightness of the fillet, in that the fillets of these fish appear to be darker than otherwise.

Diet fodder containing lysine above the above-mentioned limit value in accordance with the present invention has also been used for rainbow trout where a similar effect was provided. There is reason to believe that also other salmonoides and non-salmonoid fish which by nature has reddish or pink fillet flesh, will react in the same positive way when exposed to the lysine-containing diet fodder according to the invention.

The remaining composition of the diet fodder does not seem to have any perceptible influence on the visible pink colouring of the fillet flesh of the fish. Thus, the diet fodder's nutrient and raw material content may vary according to what is desirable/necessary within the scope of the following claims.

During a series of tests, Atlantic Salmon having an average initial weight, at the first day of the test, of about 2 kg, were fed with diets as defined in FIGS. 1–6 for 6 weeks.

After 6 weeks 10 test fish from each test group were sampled for analyses, and the pigmentation was measured in the fillets.

Statistic analyses were conducted by means of Duncan's multiple range test (ranking test). Different letters above the columns in the figures indicate significant differences at significance value (p) equal to or similar than 0.05.

Figure 2:
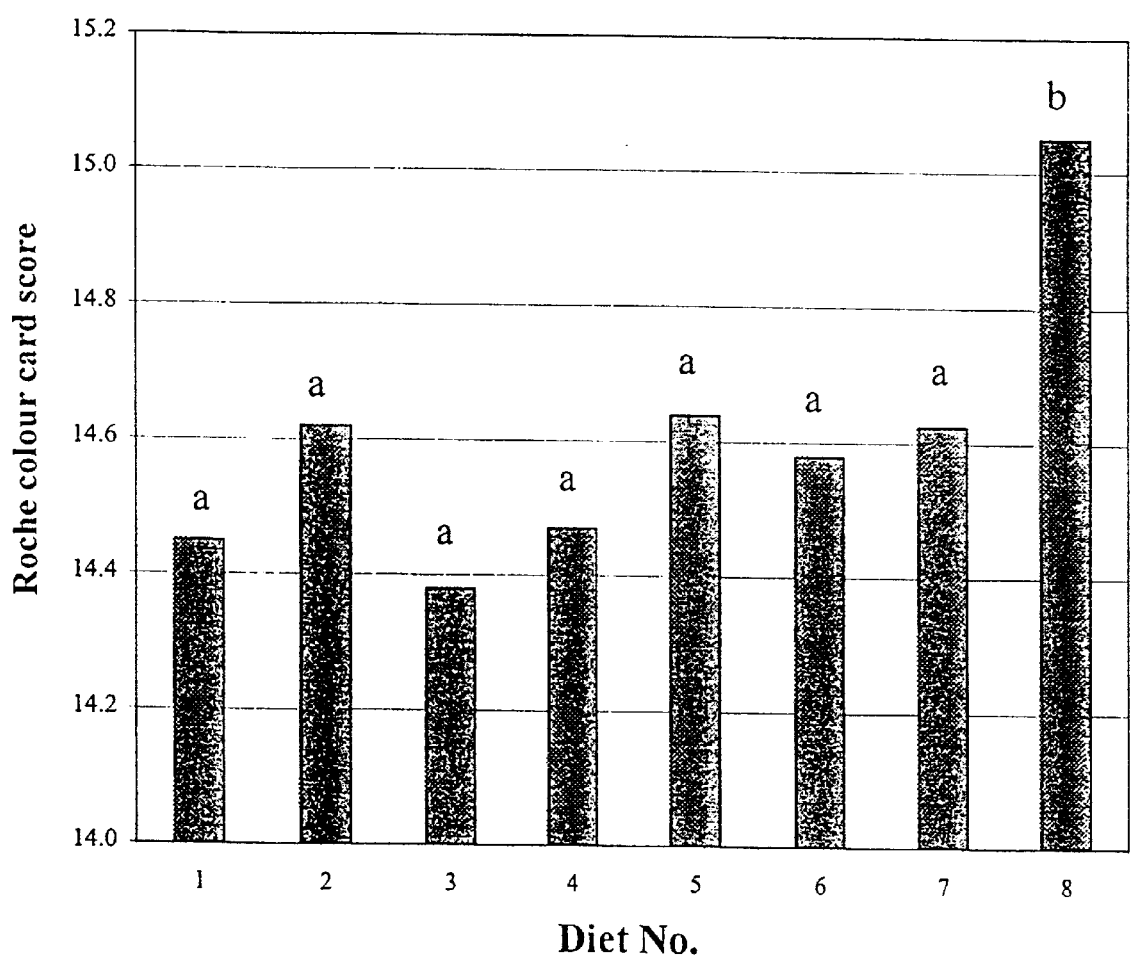
FIG. 2 is an alternative graph representing Roche color card source and diet number.
Figure 3:
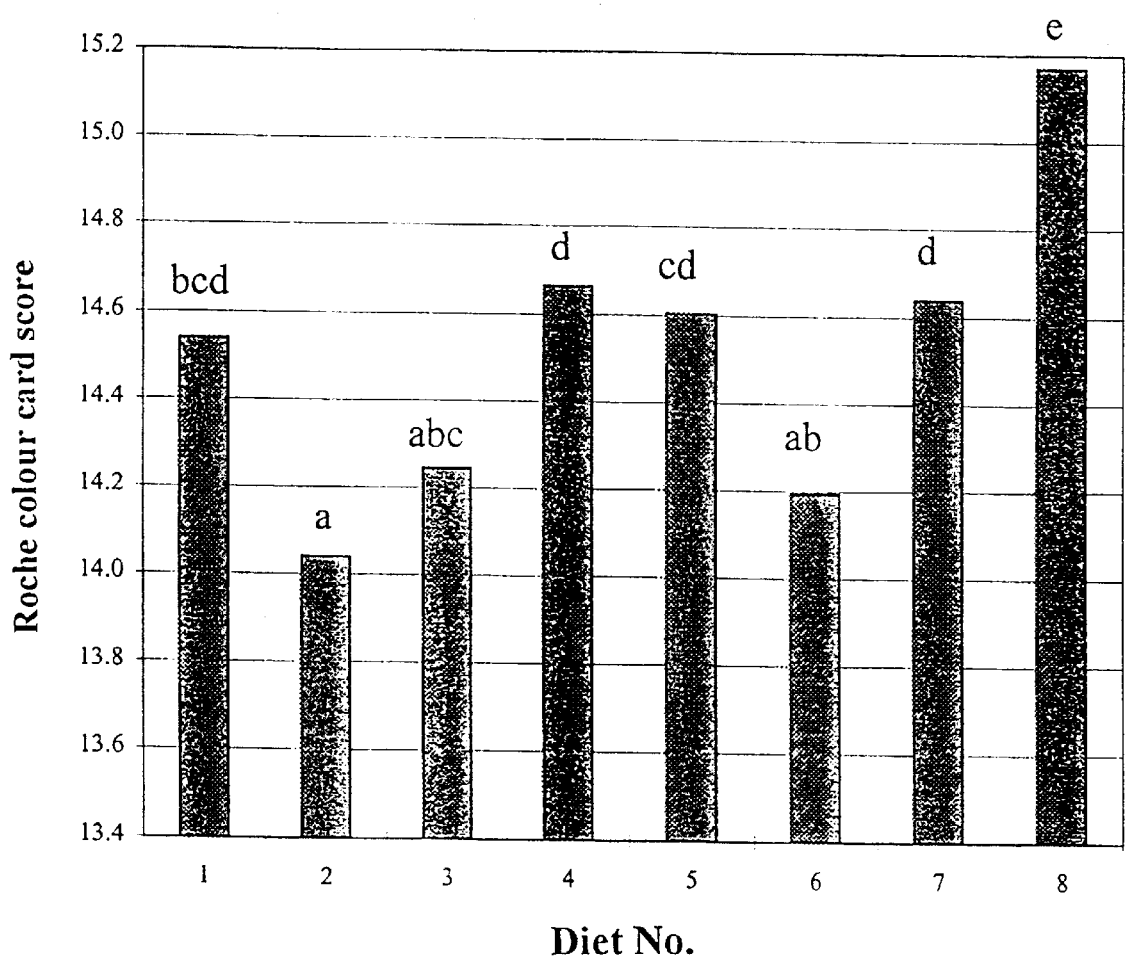
FIG. 3 is an alternative graph representing Roche color card source and diet number.

FIGS. 1, 2 and 3 show Roche colour card score on various locations of the fillet (location A=shoulder; location B=back; location C=belly flap).

Figure 4:
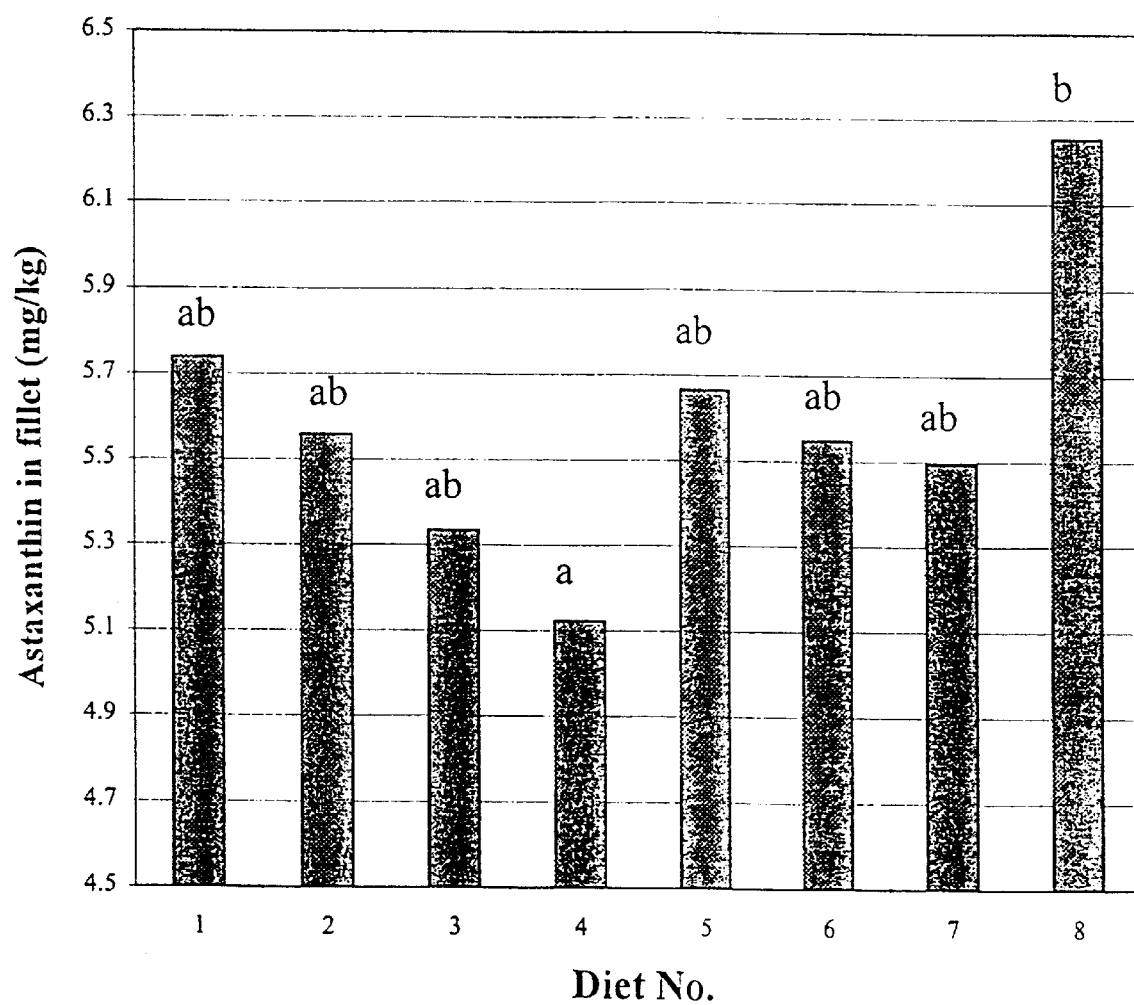
FIG. 4 is a graph representing Astaxanthin in fillet (mg/kg) vs. diet number.

FIG. 4 shows the average astaxanthin concentration in the whole homogenised fillet of the experimental fish.

The astaxanthin concentration for group 8 differed from group 4 (FIG. 4) only. On the other hand, the visual pigmentation measured by means of Rock colour card, was significantly higher in group 8 as compared with all the other groups (FIGS. 1–3).

TABLE 1

Chemical composition in the experimental diets

| Diet No. | Astaxanthin mg/kg | Protein % | Fat % | Lysine % of Protein |
| --- | --- | --- | --- | --- |
| Diet 1 | 36.2 | 43.2 | 34.7 | 5.9 |
| Diet 2 | 34.6 | 42.5 | 35.3 | 6.4 |
| Diet 3 | 36.8 | 42.3 | 34.9 | 6.8 |
| Diet 4 | 34.1 | 42.1 | 36.5 | 7.1 |
| Diet 5 | 34.2 | 42.9 | 36.4 | 7.2 |
| Diet 6 | 34.2 | 43.0 | 36.2 | 7.5 |
| Diet 7 | 34.4 | 42.6 | 35.6 | 8.1 |
| Diet 8 | 33.9 | 42.6 | 34.9 | 9.1 |

During a later experiment, two groups of rainbow trout were fed with two diets in sea water. The trout had an average initial weight of 2.7 kg and an average final weight of 3.3 kg. The diet composition is expressed in table 2:

TABLE 2

Chemical composition of the experimental diets

| Fodder code | Astaxanthin (mg/kg) | Protein % | Fat % | Lysine % of Protein |
| --- | --- | --- | --- | --- |
| Low lysine content | 39.1 | 40.6 | 29.1 | 6.15 |
| High lysine content | 38.0 | 38.1 | 31.9 | 8.58 |

Figure 5:
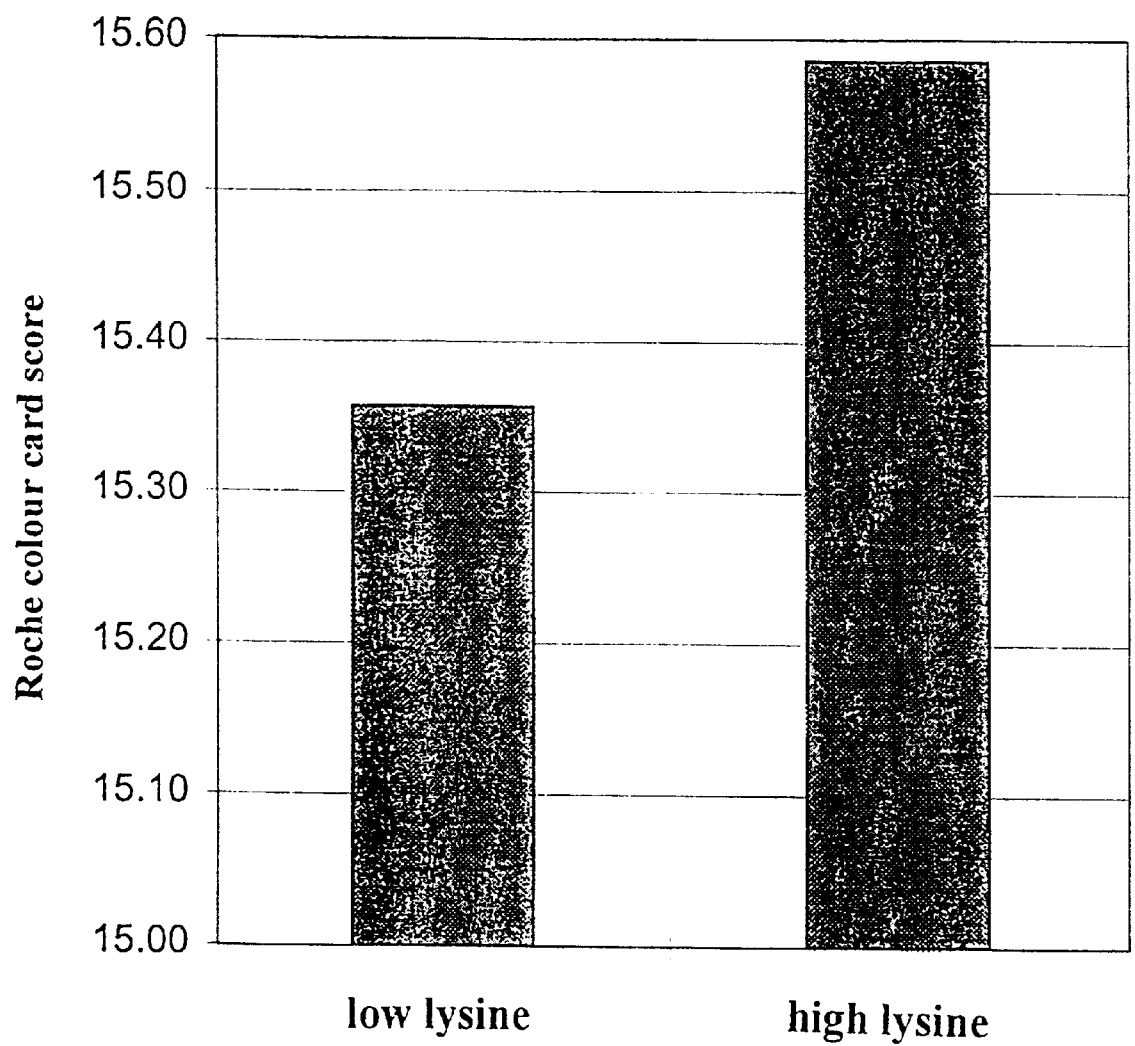
FIG. 5 is an alternative graph representing Roche color card source and low lysine and high lysine.
Figure 6:
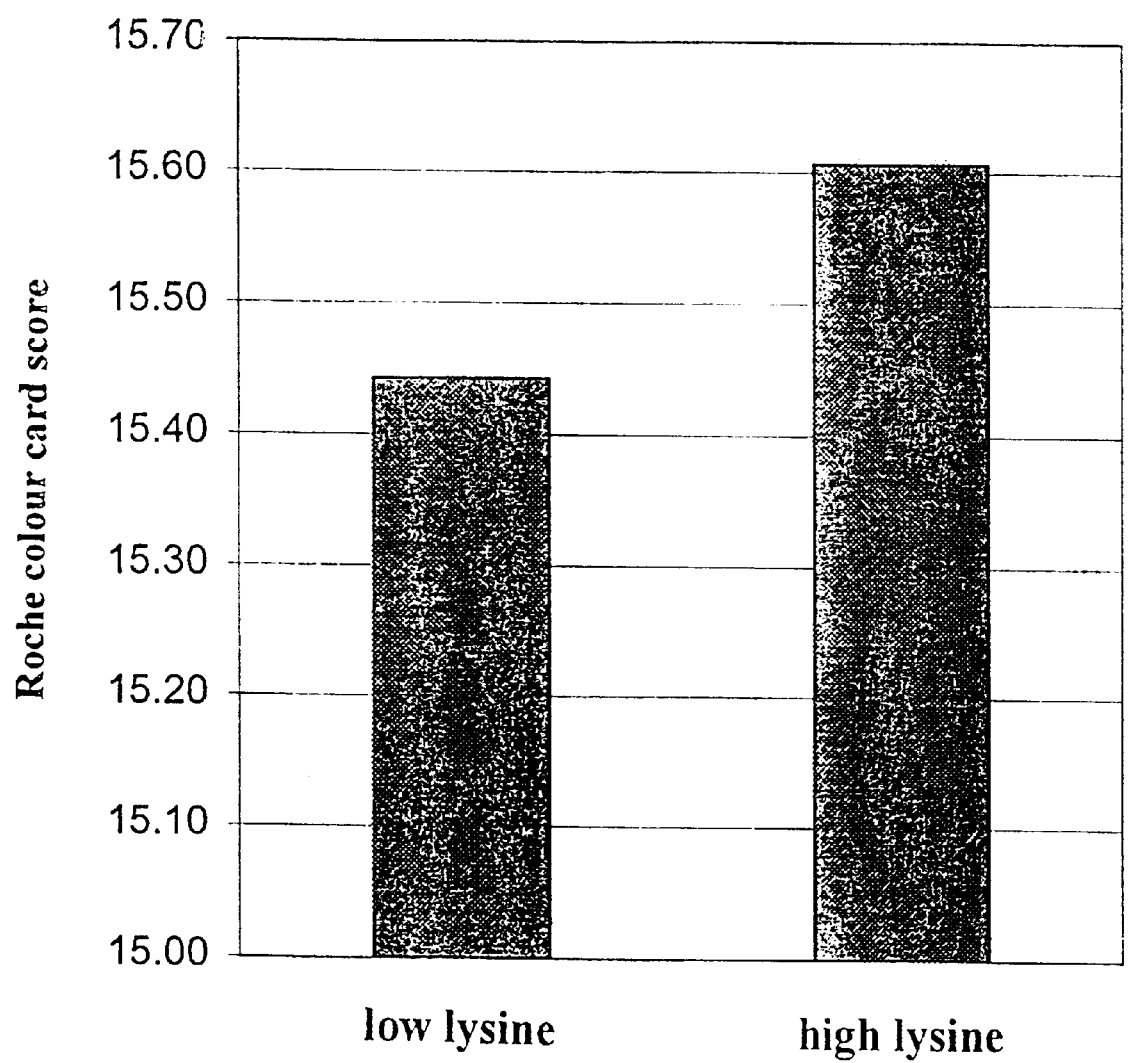
FIG. 6 is an alternative graph representing Roche color card source and low lysine and high lysine.

The fish were fed with these diets for 47 days, and 14 fish were sampled from each group for testing at the end of the test. Roche colour card was red on location B (back) and C (belly flap). FIGS. 5 and 6 show these results. Again, the diet containing the high lysine concentration increased the visual pimentation of the fillet at the two reading locations.

REFERENCES

Anderson, J. S., S. P. Lall, D. M. Anderson and Mary A. McNiven 1993: Quantitative dietary lysine requirement of Atlantic Salmon (Salmo salar) fingerlings; Can. J. Fish. Aquat. Sci. 50:–316–322:

What is claimed is:

1. A fish fodder for feeding to fish for breeding purposes, said fish providing fillets upon harvesting, said fish fodder comprising:

A diet fodder comprising at least one agent, said agent improving the visual color of said fillets, said agent comprising an amount of protein and an amount of lysine, said amount of lysine being at least 8.6% of said amount of protein.

2. The fish fodder according to claim 1 further comprising an amount of a carotenoid.

3. A fish fodder for feeding to fish for breeding purposes, said fish providing fillets upon harvesting, said fish fodder comprising:

A diet fodder comprising at least one agent, said agent improving the visual color of said fillets, said agent comprising a concentration of protein and a concentration of lysine, said concentration of lysine being at least 8.6% of said concentration of protein.

4. The fish fodder according to claim 3, further comprising a concentration of a carotenoid.

5. A method of feeding fish for breeding purposes, said fish providing fish fillets upon harvesting, said method comprising:

a) feeding said fish with a diet fodder for a period of time between 4 and 8 weeks in duration for purposes of improving the color of said fish fillets, said fodder comprising at least one agent, said agent comprising an amount of protein and an amount of lysine, said amount of lysine being at least 8.6% of said amount of protein;

b) terminating said feeding; and c) delaying the harvest of said fish establishing a starvation period for said fish prior to harvesting.

6. A method according to claim 5, wherein said 4 to 8 week period of time is continuous.

7. The method according to claim 5, said feeding further comprising the provision of a carotenoid.

* * * * *

UNITED STATES PATENT AND TRADEMARK OFFICE
CERTIFICATE OF CORRECTION

PATENT NO. : 6,337,096 B1
DATED : January 8, 2002
INVENTOR(S) : Wolfgang M. Koppe It is certified that error appears in the above-identified patent and that said Letters Patent is hereby corrected as shown below:

<u>Title page,</u>
Item [87], delete "WO99/45798." and insert -- WO/99/45796. --

Item [57], line 2, delete "salmonoides." and insert -- salmonids. --

<u>Column 1,</u>
Lines 6, 10, 22, 28, 46 and 51, delete "salmonoides." and insert -- salmonids. --

<u>Column 2,</u>
Lines 15, 57 and 58, delete "salmonoides." and insert -- salmonids. --

Signed and Sealed this

Tenth Day of September, 2002

Attest:

Attesting Officer

JAMES E. ROGAN
*Director of the United States Patent and Trademark Office*